United States Patent
Ireland et al.

(10) Patent No.: US 6,519,610 B1
(45) Date of Patent: Feb. 11, 2003

(54) DISTRIBUTED REFERENCE LINKS FOR A DISTRIBUTED DIRECTORY SERVER SYSTEM

(75) Inventors: Robert Carey Ireland, Sundance, UT (US); DeeAnne Barker Higley, Provo, UT (US); Dale Robert Olds, Sandy, UT (US); Renea Berry Campbell, Orem, UT (US)

(73) Assignee: Novell, Inc., Provo, UT (US)

( * ) Notice: Subject to any disclaimer, the term of this patent is extended or adjusted under 35 U.S.C. 154(b) by 234 days.

(21) Appl. No.: 09/654,440

(22) Filed: Sep. 1, 2000

(51) Int. Cl.[7] .............................. G06F 17/30
(52) U.S. Cl. .................................. 707/104.1
(58) Field of Search ............... 707/10, 101, 103 R, 707/104.1; 709/215, 229; 717/121

(56) References Cited

U.S. PATENT DOCUMENTS

| | | | |
|---|---|---|---|
| 5,677,851 A | * 10/1997 | Kingdon et al. ............ 709/225 |
| 5,758,344 A | * 5/1998 | Prasad et al. ................. 707/10 |
| 5,832,487 A | 11/1998 | Olds et al. .................... 707/10 |
| 5,983,234 A | * 11/1999 | Tietjen et al. ............ 707/103 R |
| 6,047,312 A | 4/2000 | Brooks et al. .............. 709/203 |
| 6,052,724 A | 4/2000 | Willie et al. ................ 709/223 |
| 6,286,010 B1 | * 9/2001 | Ramachandran et al. ... 707/103 R |

* cited by examiner

Primary Examiner—Diane D. Mizrahi
Assistant Examiner—Apu M Mofiz
(74) Attorney, Agent, or Firm—Haynes and Boone, LLP

(57) ABSTRACT

Distributed Reference Links ("DRLs") for managing the referential integrity between objects in a distributed directory server system are described. In a preferred embodiment, DRLs specify a set of attributes, precedents, and algorithms that define how a resource can notify other resource managers of a change in the identity information of one of its objects. Using DRLs, before an external reference to an object is created, a "UsedBy" attribute identifying the partition that will include contain the external reference is added to any R/W replica of the object prior to the creation of the external reference object.

16 Claims, 2 Drawing Sheets

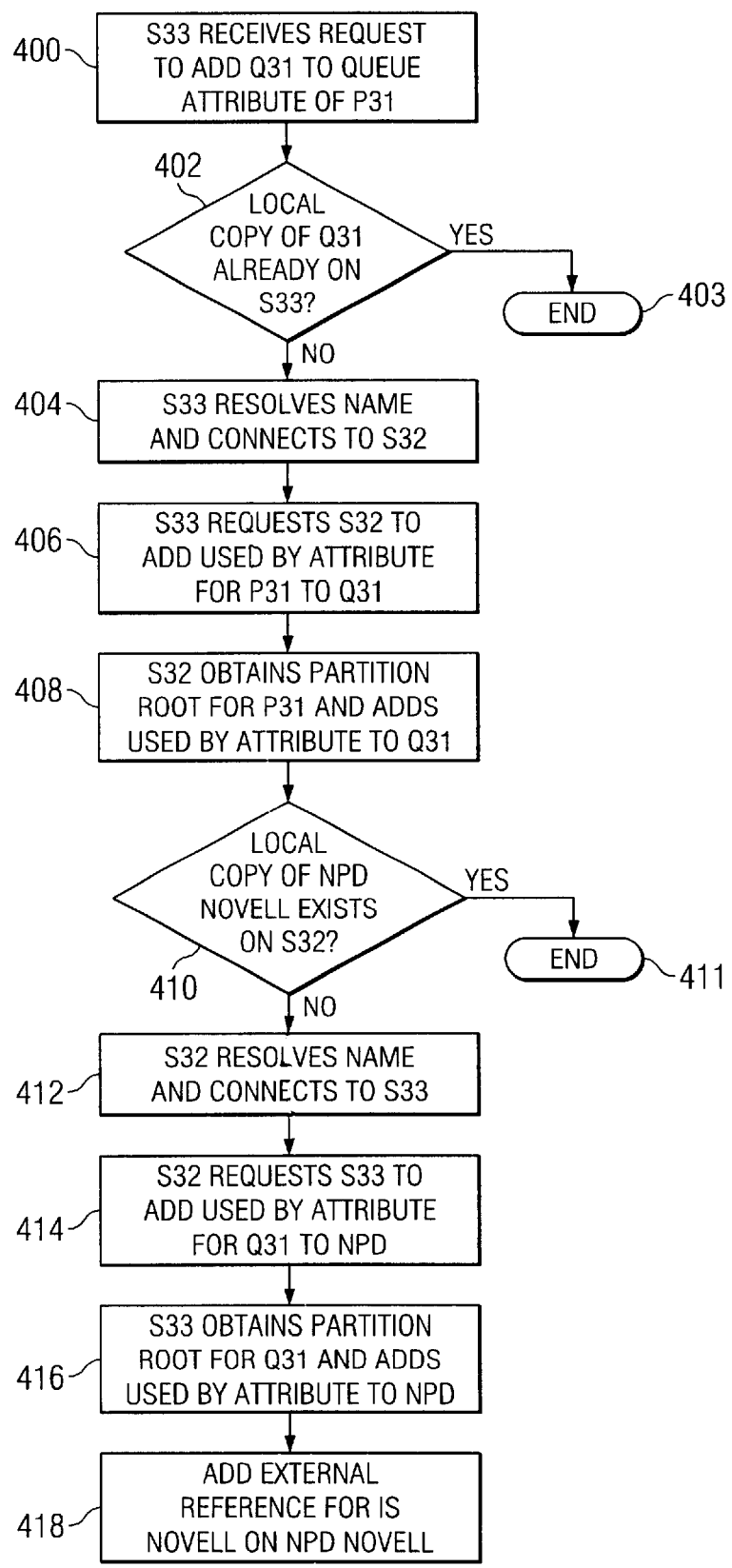

DISTRIBUTED REFERENCE LINKS FOR A DISTRIBUTED DIRECTORY SERVER SYSTEM

BACKGROUND OF THE INVENTION

This invention relates generally to distributed directory server systems, and more specifically to a system and method for maintaining referential integrity between objects in a distributed directory server system.

Personal computers or workstations may be linked in a computer network to allow the sharing of data, applications, files, and other resources. In a client/server network, the sharing of resources is accomplished through the use of one or more file servers. Each file server includes a processing unit that is dedicated to managing centralized resources and to sharing these resources with other file servers and/or various personal computers and workstations, which are known as the "clients" of the server.

Directories and directory services are often provided to enable an environment for a digital identity of a particular resource. One example of a directory service is Novell Directory Services ("NDS") for Novell Netware networks, as provided by Novell, Inc. of Provo, Utah. NDS provides a logical tree-structure view of all resources on the network so that users can access them without knowing where they're physically located.

A directory tree can be partitioned in to several smaller sub-trees that are stored on many file servers. These partitions are said to be "replicated" on the servers. Each file server in the tree may contain anywhere from no replica of any partition to a replica of each partition.

Two important concepts in understanding the internal workings of NDS are external references and backlinks. An external reference is a reference to an entry that is not physically located on the local server. An external reference allows a reference to an entry without duplicating the entry on every server in the directory tree. External references are created for several reasons, including to ensure tree connectivity, to provide for authentication, and to refer to a nonlocal entry that is referenced in the attribute of a local entry.

A corresponding attribute to the external reference is the backlink. A backlink is stored as an object attribute to keep track of external references to the object. The directory uses a "BackLink" attribute to keep track of servers holding external references of an entry. The BackLink attribute has two parts, including the Distinguished Name(s) of the server (s) holding the external reference (this name is commonly referred to as the Remote Server Name) and the Entry ID of the external reference on the remote server (usually referred to as the Remote ID). When creating an external reference to an entry, NDS also schedules the creation of a BackLink attribute for the entry. Periodically, a backlink process checks the external reference to see if the original entry still exists and if there is a reason for the external reference to continue to exist. If the external reference is not needed, NDS removes it.

The backlink process enables easy maintenance of the external references by periodically verifying the remote server name and remote ID of each BackLink attribute of entries. When an entry is deleted, backlinks make it possible for all references to the entry to be deleted. Backlinks also facilitate renaming and moving entries, because the corresponding changes can be made to the external references through the operation of the backlink process. Thus, the backlink process helps to maintain the integrity of external references by allowing them to be updated to reflect the changes made to the objects they refer to. The back link process resolves external references to make sure there is a real entry that it refers to, and for real entries the process makes sure that an external reference exists. A local bit in each external reference is used to keep track of the status of backlinks.

When a server creates an external reference to an entry, it sends a CreateBackLink request to a server holding a writable copy of the entry. This request contains the local Entry ID, the remote Entry ID, the remote server name, and two Time Stamps (Remote Creation Time and Remote Key Time). If the CreateBackLink request fails, it retries periodically until the BackLink attribute is created.

When a server removes an external reference from its local database, it sends a RemoveBackLink request to a server holding a writable entry for the entry. The request contains the Local Entry ID, the Remote Entry ID, the Server Entry ID, and the Time Stamp (Entry Creation Time). This RemoveBackLink request operation causes the backlink to be deleted.

As previously described, when NDS creates a new external reference for an entry not stored on the local server, NDS attempts to place on the real entry a backlink that points to the server that holds the external reference. For example, referring to FIGS. 1a and 1b, a tree 100 representing NDS includes two servers NS1 and NS2. The tree 100 is named, in this case, "Novell," by its root object. As shown in FIG. 1b, the server NS1 stores a master replica of partitions "[Root]" and "Provo" and a read/write replica of a partition "Core_OS.Provo" and the server NS2 stores a master replica of the partition Core_OS.Provo. Partitions [Root], Provo and Core_OS.Provo are represented in FIG. 1a by partition objects designated 102, 104, and 106, respectively. Because the server NS2 does not have a replica of partition Provo, the server NS2 needs an external reference for partition Provo to connect partition Core_OS.Provo with [Root]. When NDS creates an external reference to partition Provo on server NS2, NDS places a backlink on server NS1's copy of entry Provo pointing to NS2. In operation, server NS2 sends a CreateBackLink request that includes the backlink as an attribute value for the partition Provo.

The algorithm for creating a backlink is as follows. The server where the external reference is created sends a CreateBackLink request to the server holding a writable copy of the object. The server holding the original entry creates a backlink pointing to the server holding the external reference by adding to the original entry a BackLink attribute identifying the server holding the external reference and the identity of the external reference. The server holding the real entry returns a CreateBackLink reply. If this operation fails, NDS attempts to create the backlink nine more times at three-minute intervals. If all nine attempts fail, a background backlink process creates the backlink. The backlink process occurs every thirteen hours or as set by the system administrator and removes any expired or unnecessary external references from the system and creates and maintains any backlinks that NDS could not create when it created the external reference.

When NDS removes an external reference, the server holding the external reference requests that the server holding the real entry delete the backlink. NDS uses the RemoveBackLink process to delete a backlink. The server holding the external reference sends the server holding the real entry a RemoveBackLink request. The server holding the real entry deletes the backlink and returns a RemoveBackLink code indicating success or failure.

Referring to FIGS. 2a and 2b, a directory tree 200 includes a server S1 that stores a master replica of a partition a and a master replica of a partition b.a and a server S2 that stores a read/write ("R/W") replica of partition a and a master replica of a partition c.a. Partitions a, b.a, and c.a are respectively represented in FIG. 2a by partition objects a, b, and c. A printer object P1.c.a, represented in FIG. 2a by an object P1, in partition c.a is servicing a queue object Q1.b.a, represented in FIG. 2a by an object Q1, located in partition b.a. In this example, the queue object Q1.b.a will appear as a value of the queue attribute of the printer object P1.c.a. Because the server S2 does not have a replica of b.a., server S2 must have an external reference object of queue object Q1.b.a. The only reason the queue object Q1.b.a exists on server S2 is because the printer object P1.c.a has a reference to it.

As previously indicated, the server S1 has a master replica of the partition b.a; therefore, this server will contain the real object Q1.b.a and it must be able to locate all occurrences of the object Q1.b.a in the tree 200 in the event that the object is renamed or deleted. There is a replica ring that will identify every server that has a replica of the partition b.a but there must also be a way to locate the external reference objects that were created on servers that do not have a replica of the partition b.a, such as the server S2. Specifically, when the external reference for the object Q1.b.a is created on the server S2, a BackLink attribute is added to the object Q1.b.a on the server S1 that identifies that the server S2 contains an external reference thereto. That is the purpose of backlinks: to identify every server where an external reference to an object exists.

With backlinks, when an external reference is created on a server's local database, all replicas of the object will get a backlink that points to the server where the external reference exists. The link from the object to the external reference is maintained at the server level. In practice, what occurs is that almost every server in the tree knows about every other server. Clearly, this is not desirable.

Because backlinks are server-specific, they do not scale well in trees with a large number of servers. This deficiency is difficult to see in the above example, but consider an example in which 100 servers in a tree have an external reference for the queue object Q1.b.a. In this case, there will be a BackLink attribute on the object Q1.b.a for each of these servers; i.e., 100 BackLink attributes on the single queue object.

Moreover, as backlinks identify a server, in this case, S2, that holds an external reference, if the identified server does not exist in a local replica of server S1, an external reference will be created for S2.c.a. on server S1.

In addition, it is not uncommon for backlinks to "orphan" external references. Specifically, with backlinks, an external reference is created first and the backlink thereto is later added in a background process. In some cases, the latter process (i.e., the addition of the backlink) never happens and the external reference is orphaned.

Therefore, what is needed is an improved means for identifying servers on which an external reference to an object exists.

SUMMARY OF THE INVENTION

One embodiment, accordingly, employs Distributed Reference Links ("DRLs") for managing the referential integrity between objects in a distributed system. In particular, DRLs perform a similar function as backlinks, but instead of identifying every server on which an external reference to an object exists, a DRL comprises a "UsedBy" attribute added to an object that identifies a partition that has an external reference to that object.

In a preferred embodiment, DRLs specify a set of attributes, precedents, and algorithms that define how a resource can notify other resource managers of a change in the identity information of one of its objects. Using DRLs, before an external reference object is created, a "UsedBy" attribute identifying the partition that reference the external reference is added to a R/W replica of the object prior to the creation of the external reference object.

A technical advantage achieved with the invention is that DRLs are not server specific and therefore scale better than backlinks in trees with a large number of servers.

Another technical advantage achieved with the invention is that DRLs are less likely to orphan external references than backlinks, as the DRL is created prior, rather than subsequent, to creation of the external reference.

Yet another technical advantage achieved with the invention is that DRLs can be extended to maintain the integrity of references stored in future agents.

Yet another technical advantage achieved with the invention is that DRLs decrease network traffic and the number of connections NDS maintains to other servers in a directory tree.

Still another technical advantage achieved with the invention is that DRLs facilitate backup of NDS objects.

BRIEF DESCRIPTION OF THE DRAWINGS

FIG. 4 is a flowchart illustrating the operation of the DRL process according to one embodiment.

DETAILED DESCRIPTION OF A PREFERRED EMBODIMENT

Figure 1A:
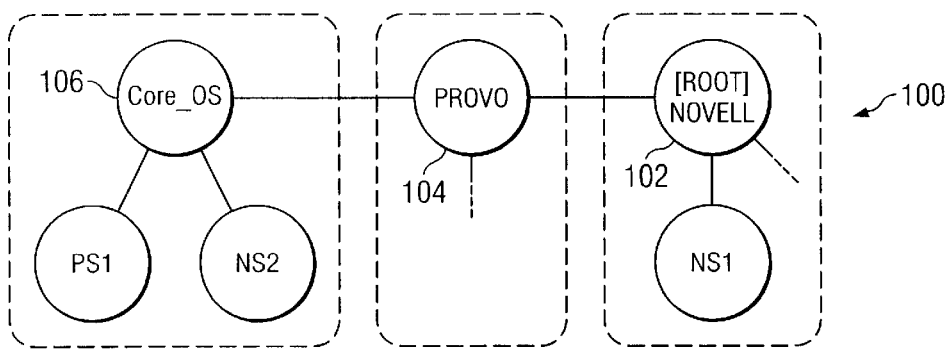
FIGS. 1a and 1b illustrate the prior art use of backlinks to point to external references.
Figure 1B:
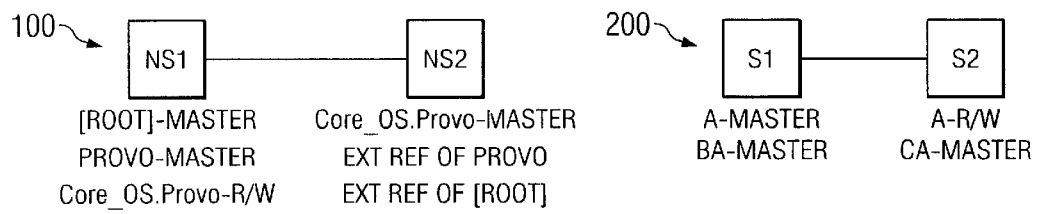
Figure 2B:
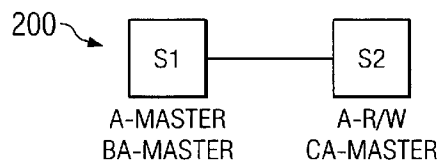
FIGS. 2a and 2b illustrate a directory tree according to one embodiment.
Figure 2A:
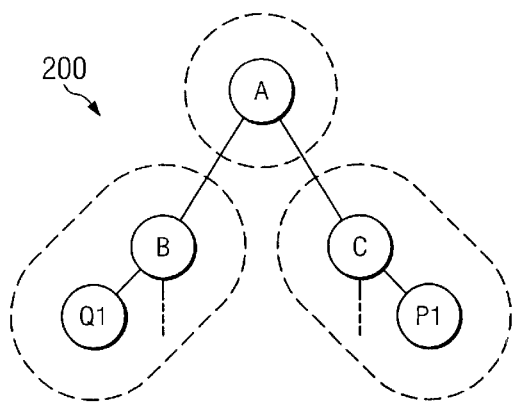

Referring again to FIGS. 2a and 2b, the example illustrated therein will now be described using DRLs rather than backlinks. In particular, when the user assigns the queue object Q1.b.a to be serviced by the printer P1.c.a, an external reference for Q1.b.a must be created since the server S2 does not contain a replica of the partition b.a. Before that external reference is created, object Q1.b.a on server S1 will have a UsedBy attribute added thereto to indicate that partition c.a. contains a reference to the object. Ultimately, partition object c.a will have a UsedBy attribute added thereto to indicate that partition b.a. contains a reference thereto and partition object b.a will have a UsedBy attribute added thereto to indicate that partition c.a contains a reference thereto. In this manner, the link from the R/W copy of the object to the external reference thereto is maintained on a partition-by-partition, rather than a server-by-server, basis.

Figure 3A:
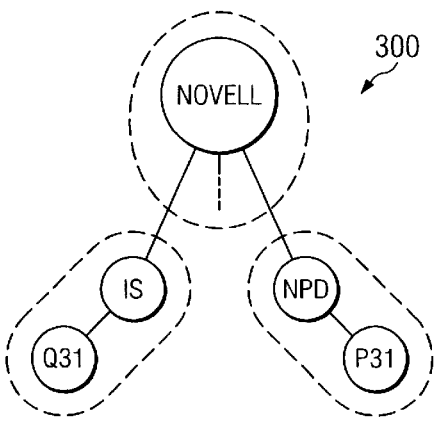
FIGS. 3a and 3b illustrate the use of DRLs in another directory tree according to one embodiment.
Figure 3B:
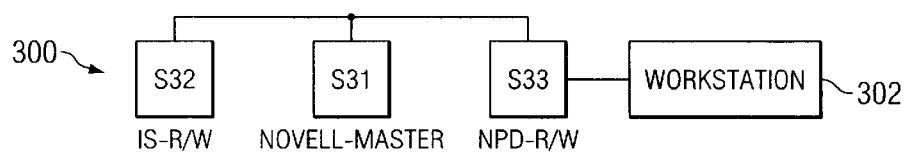

Referring now to FIGS. 3a and 3b and FIG. 4, operation of the DRL process will be described in greater detail. As shown in FIGS. 3a and 3b, a directory tree 300 includes three servers S31, S32, and S33. The server S31 stores a master replica of a partition "Novell", the server S32 stores a R/W replica of a partition "IS.Novell", and the server S33 stores a R/W replica of a partition "NPD.Novell." It will be assumed for the sake of example that a user at a workstation 302 connected to the server S33 desires to assign a printer object P31.NPD.Novell, represented in FIG. 3a by a printer object P31, to service a print queue object Q31.IS.Novell, represented in FIG. 3a by a queue object Q31. Partitions Novell, NPD.Novell, and IS.Novell are represented in FIG. 3a by partition objects Novell, NPD, and IS, respectively.

Referring now to FIG. 4, once the user selects the queue object Q31 from a queue list of the printer object P31, in step 400, the server S33 receives an NDS packet requesting to add Q31.IS.Novell to a queue attribute of the printer object P31. In step 402, the server S33 checks to see if a local object for Q31.IS.Novell already exists. If so, there is no need to create an external reference for the object and execution terminates in step 403; otherwise execution proceeds to step 404, in which the server S33 resolves the name NPD.Novell and gets a connection to the server S32. In step 406, the server S33 sends to the server S32 a packet requesting a "UsedBy" attribute for the printer object P31 be added to the queue object Q31. In step 408, the server S32 obtains the partition root for P31.NPD.Novell, which is NPD.Novell, and prepares to add NPD.Novell to the UsedBy attribute on Q31.IS.Novell.

In step 410, the server S32 checks to see if a local object for NPD.Novell already exists. If so, there is no need to create an external reference and execution terminates in step 411; otherwise, execution proceeds to step 412, in which the server S32 resolves the name Q31.IS.Novell and gets a connection to the server S33. In step 414, the server S32 sends to the server S33 a packet requesting that a UsedBy attribute be added to the partition object NPD for the queue object Q31. In step 416, the server S33 obtains the partition root for Q31.IS.Novell, which is IS.Novell, and prepares to add IS.Novell to the UsedBy attribute of NPD.Novell. Execution then proceeds to step 418. Similarly, if it is determined in step 402 that a local object for Q31.IS.Novell does exist on server S33 or if it is determined in step 410 that a local object for NPD.Novell does exist on server S32, execution proceeds directly to step 418. In step 418, since NPD.Novell is a partition root, the recursion of steps 402–416 is halted and an external reference for IS.Novell is created on NPD.Novell.

Accordingly, using DRLs instead of backlinks to maintain the links from an object to external references thereto in the manner heretofore explained affords the various advantages described above.

Although an illustrative embodiment has been shown and described, a wide range of modification, change, and substitution is contemplated in the foregoing disclosure and in some instances, some features of the embodiment may be employed without a corresponding use of other features. Accordingly, it is appropriate that the appended claims be construed broadly and in a manner consistent with the scope of the embodiment disclosed herein.

What is claimed is:

1. In a distributed database system including multiple partitions stored on a plurality of interconnected servers, a method of keeping track of external references created on the servers, the method comprising:

responsive to a request to add to a local server an external reference to a nonlocal object, the local server connecting to a remote server on which an original copy of the non-local object is stored;

adding a UsedBy attribute to the original copy of the non-local object on the remote server, the UsedBy attribute identifying a partition object representing a partition on the local server to which the external reference to the non-local object is to be added; and adding the external reference to the non-local object to local server in the partition represented by the identified partition object.

2. The method of claim 1 further comprising, subsequent to adding a UsedBy attribute to the original copy of the non-local object and prior to adding the external reference:

the remote server connecting to the local server; and adding a UsedBy attribute to the identified partition object on the local server indicating a partition root for the non-local object.

3. The method of claim 1 further comprising, prior to said adding the external reference:

determining whether the object to which the UsedBy attribute has been added is a partition root; and if the object to which the UsedBy attribute has been added is a partition root, adding the external reference.

4. In a distributed database system including first and second partitions, wherein a read/write ("R/W") copy of the first partition including a first object is stored on a first server and a R/W copy of the second partition including a second object is stored on a second server connected to the first server, a method of keeping track of external references created on the servers, the method comprising:

responsive to a request to add an external reference to the first object to the R/W copy of the second partition, the second server connecting to the first server;

adding a UsedBy attribute to the first object on the first server, the UsedBy attribute identifying the second partition; and adding the external reference to the first object to the R/W copy of the second partition.

5. The method of claim 4 further comprising, subsequent to adding a UsedBy attribute to the first object on the first server and prior to adding the external reference:

the first server connecting to the second server; and adding a UsedBy attribute to a partition object representing the R/W copy of the second partition identifying a partition root for the first object.

6. The method of claim 5 wherein the first object is a print queue object and said second object is a printer object, and wherein the external reference to the print queue object is added to a queue attribute of said printer object.

7. The method of claim 6 wherein the UsedBy attribute added to the queue object identifies a partition root of the printer object.

8. The method of claim 7 wherein the UsedBy attribute added to the partition object identifies a partition root for the queue object.

9. In a distributed database system including multiple partitions stored on a plurality of interconnected servers, a system for keeping track of external references created on the servers, the system comprising:

means responsive to a request to add to a local server an external reference to a non-local object for causing the local server to connect to a remote server on which an original copy of the non-local object is stored;

means for adding a UsedBy attribute to the original copy of the non-local object on the remote server, the UsedBy attribute identifying a partition object representing a partition on the local server to which the external reference to the non-local object is to be added; and means for adding the external reference to the non-local object to local server in the partition represented by the identified partition object.

10. The system of claim 9 further comprising:

means for connecting the remote server to the local server subsequent to adding a UsedBy attribute to the original copy of the non-local object and prior to adding the external reference; and means for adding a UsedBy attribute to the identified partition object on the local server indicating a partition root for the non-local object.

11. The system of claim 9 further comprising:

means for determining whether the object to which the UsedBy attribute has been added is a partition root prior to said adding the external reference; and means for adding the external reference if the object to which the UsedBy attribute has been added is a partition root.

12. A distributed database system comprising:

a first server;

a second server;

wherein a read/write ("R/W") copy of a first partition including a first object is stored on a first server and a R/W copy of a second partition including a second object is stored on a second server connected to the first server;

wherein responsive to a request to add an external reference to the first object to the R/W copy of the second partition, the second server connects to the first server, the first server adds a UsedBy attribute to the first object, the UsedBy attribute identifying the second partition, and the second server adds the external reference to the first object to the R/W copy of the second partition.

13. The system of claim 12 wherein subsequent to adding a UsedBy attribute to the first object on the first server and prior to adding the external reference, the first server connects to the second server and the second server adds a UsedBy attribute to a partition object representing the second partition identifying a partition root for the first object.

14. The system of claim 13 wherein the first object is a print queue object and said second object is a printer object, and wherein the external reference to the print queue object is added to a queue attribute of said printer object.

15. The system of claim 14 wherein the UsedBy attribute added to the queue object identifies a partition root of the printer object.

16. The system of claim 15 wherein the UsedBy attribute added to the partition object identifies a partition root for the queue object.

* * * * *